(12) United States Patent
Coulson et al.

(10) Patent No.: US 9,158,407 B2
(45) Date of Patent: Oct. 13, 2015

(54) CAPACITIVE TOUCH PANEL WITH A 'DUAL LAYER' FORCE SENSOR

(75) Inventors: Michael Paul Coulson, Oxford (GB); Christopher James Brown, Oxford (GB); Dauren Slamkul, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 480 days.

(21) Appl. No.: 13/597,925

(22) Filed: Aug. 29, 2012

(65) Prior Publication Data

US 2014/0062933 A1    Mar. 6, 2014

(51) Int. Cl.
*G06F 3/044* (2006.01)
*G06F 3/041* (2006.01)

(52) U.S. Cl.
CPC .............. *G06F 3/0414* (2013.01); *G06F 3/044* (2013.01); *G06F 2203/04106* (2013.01)

(58) Field of Classification Search
CPC ................................ G06F 3/044; G06F 3/0414
See application file for complete search history.

(56) References Cited

U.S. PATENT DOCUMENTS

| | | | |
|---|---|---|---|
| 4,293,734 A | 10/1981 | Pepper | |
| 5,915,285 A | 6/1999 | Sommer | |
| 6,492,979 B1 | 12/2002 | Kent | |
| 7,511,702 B2 | 3/2009 | Hotelling | |
| 7,538,760 B2 | 5/2009 | Hotelling | |
| 2007/0236466 A1* | 10/2007 | Hotelling | 345/173 |
| 2011/0057899 A1* | 3/2011 | Sleeman et al. | 345/174 |
| 2014/0062934 A1* | 3/2014 | Coulson et al. | 345/174 |

OTHER PUBLICATIONS

U.S. Appl. No. 13/541,423, Jul. 2012, Coulson et al.
U.S. Appl. No. 13/435,898, Mar. 2012, Brown et al.

* cited by examiner

*Primary Examiner* — Dorothy Harris
(74) *Attorney, Agent, or Firm* — Renner, Otto, Boisselle & Sklar, LLP

(57) ABSTRACT

A capacitive touch panel includes a first substrate and a second substrate arranged relative to the first substrate. A plurality of drive electrodes are arranged on the first substrate, wherein each drive electrode comprises a first drive electrode section and a second drive electrode section. In addition, a plurality of sense electrodes are arranged on the second substrate, the plurality of sense electrodes including touch sensing electrodes and force sensing electrodes. At least part of a sense electrode of the plurality of sense electrodes forms a force sensitive coupling capacitance with a second drive electrode section and not with a first drive electrode section.

19 Claims, 17 Drawing Sheets

CAPACITIVE TOUCH PANEL WITH A 'DUAL LAYER' FORCE SENSOR

TECHNICAL FIELD AND APPLICATIONS OF THE INVENTION

The present invention relates to touch panel devices and, more particularly, to capacitive type touch panels. A capacitive type touch panel device may find application in a range of consumer electronic products including, for example, mobile phones, tablet and desktop PCs, electronic book readers and digital signage products.

BACKGROUND ART

Touch panels have recently become widely adopted as the input device for high-end portable electronic products such as smart-phones and tablet devices. Although, a number of different technologies can be used to create these touch panels, capacitive systems have proven to be the most popular due to their accuracy, durability and ability to detect touch input events with little or no activation force.

The most basic method of capacitive sensing for touch panels is demonstrated in surface capacitive systems, for example as disclosed in U.S. Pat. No. 4,293,734 (Pepper, Oct. 6, 1981). A typical implementation of a surface capacitance type touch panel is illustrated in FIG. 1 and comprises a transparent substrate 10, the surface of which is coated with a conductive material that forms a sensing electrode 11. One or more voltage sources 12 are connected to the sensing electrode, for example at each corner, and are used to generate an electrostatic field above the substrate. When a conductive object, such as a human finger 13, comes into close proximity to the sensing electrode, a capacitor 14 is dynamically formed between the sensing electrode 11 and the finger 13 and this field is disturbed. The capacitor 14 causes a change in the amount of current drawn from the voltage sources 12 wherein the magnitude of current change is related to the distance between the finger location and the point at which the voltage source is connected to the sensing electrode. Current sensors 15 are provided to measure the current drawn from each voltage source 12 and the location of the touch input event is calculated by comparing the magnitude of the current measured at each source. Although simple in construction and operation, surface capacitive type touch panels are unable to detect multiple simultaneous touch input events as occurs when, for example, two or more fingers are in contact with the touch panel.

Another well-known method of capacitive sensing applied to touch panels can be found in projected capacitive systems. In this method, as shown in FIG. 2, a drive electrode 20 and sense electrode 21 are formed on a transparent substrate (not shown). The drive electrode 20 is fed with a changing voltage or excitation signal by a voltage source 22. A signal is then induced on the adjacent sense electrode 21 by means of capacitive coupling via the mutual coupling capacitor 23 formed between the drive electrode 20 and sense electrode 21. A current measurement means 24 is connected to the sense electrode 21 and provides a measurement of the size of the mutual coupling capacitor 23. When a conductive object such as a finger 13 is brought within close proximity of both electrodes, it forms a first dynamic capacitor to the drive electrode 27 and a second dynamic capacitor to the sense electrode 28. The effect of these dynamically formed capacitances is manifested as a reduction of the amount of capacitive coupling in between the drive and sense electrodes and hence a reduction in the magnitude of the signal measured by the current measurement means 24 attached to the sense electrode 21. As is well-known, by arranging a plurality of drive and sense electrodes in an array, such as a two-dimensional matrix array, this projected capacitance sensing method may be used to form a touch panel device. An advantage of the projected capacitance sensing method over the surface capacitance method is that multiple simultaneous touch input events may be detected. However, in spite of the multi-touch capabilities of the projected capacitive method, it has some significant limitations. For example, it cannot be used to detect the force of touch input and is unable to detect touch input from non-conductive objects such as a plastic stylus or pen.

In order to overcome these limitations, hybrid systems incorporating force sensing devices into projected capacitive touch panels have been proposed. For example, "Metal-polymer composite with nanostructured filler particles and amplified physical properties", Applied Physics Letters 88, 102013 (2006), discloses a force sensitive material which may be used to form a ring around the periphery of the touch panel. Alternatively, U.S. Pat. No. 6,492,979 (Kent, Dec. 10, 2002) describes a touch panel system incorporating discrete force sensing devices. A force sensor may also be formed in the touch sensor electrode layer: for example, U.S. Pat. No. 5,915,285 (Sommer, Jun. 22, 1999) describes strain gauges formed from Indium Tin Oxide, and inter-digitated amongst the touch sensor electrodes. However, these systems are limited in that they cannot individually measure multiple forces applied at different points.

A method of simultaneously measuring multiple separate touches, together with their associated forces, is proposed in U.S. Pat. No. 7,538,760 (Hotelling, May 26, 2009). This patent describes compressible structures of capacitive sensor electrodes, such as that shown in FIG. 3. The structure of FIG. 3 employs a layer of projected capacitive sense electrodes 410 and a first set of drive electrodes 420 to determine the location of each touch, in the manner of a conventional projected capacitive touch sensor. These sense electrodes 410 and drive electrodes 420 will typically run in orthogonal directions, and may be formed on opposite sides of a sensor substrate 430. A spring structure 440 separates the sense electrodes 410 from a second set of drive electrodes 450. A protective cosmetic layer 460 lies on top of the first set of drive electrodes, and the entire sensor structure is supported by a support substrate 470. The force applied to a point on the sensor influences the local compression of the spring structure, and therefore changes the local capacitance measured between the sense electrodes 410 and the second set of drive electrodes 450. This local capacitance is indicative of the local touch force.

A similar structure, shown in FIG. 4, is disclosed in U.S. Pat. No. 7,511,702 (Hotelling, Mar. 31, 2009). This structure employs a protective cosmetic layer 460 on top of a first transparent layer 480 and a second transparent layer 482, separated by a spring structure 440. The first transparent layer 480 has a set of drive electrodes 486, whilst the second transparent layer 482 has a set of touch sense electrodes 488 and a set of force sensing electrodes 490. Touch forces compress the deformable layer, increasing parallel plate capacitances that are measured using the force sensing electrodes 490. Simultaneously, the touch sensing electrodes are used to detect the presence of objects above the touch sensor.

In any touch sensor that relies upon parallel plate capacitances between drive electrodes and force sensing electrodes, the parallel plate capacitances may limit the frequency at which the sensor can operate. This is because, in conjunction with the resistance of the electrodes themselves, the parallel plate capacitances form electrical low pass filters. If the frequency at which the proximity sensor can operate is limited, then fewer measurements are obtained in a given amount of time. This translates either to a reduction in the signal to noise ratio, in which case smaller or more distant objects may not be detected, or to a reduction in frame rate, in which case the system will not accurately perceive rapidly changing input stimuli.

SUMMARY OF THE INVENTION

A capacitive touch sensing device of in accordance with the present invention includes a means of detecting the force applied by objects touching the surface of the device. The device is capable of simultaneously detecting the proximity of multiple objects close to its surface—the touch sensing function—and the force applied by multiple objects in contact with the surface—the force sensing function.

The touch sensing device includes an array of drive and sense electrodes. Each drive electrode is split into a first drive electrode section and a second drive electrode section, and the sense electrodes include both touch sensing electrodes and force sensing electrodes. The force sensing electrodes are arranged so that they overlap the second drive electrode sections and thereby form parallel plate capacitors, which may be used to measure applied force as the distance between the plates changes. The touch sensing electrodes are arranged such that they do not overlap any of the drive electrode sections and may therefore be used to detect objects in proximity to the sensor.

Since the touch sensing electrode does not overlap either of the drive electrode sections, no significant parallel plate capacitances are formed to the touch sensing electrode and the proximity measurement is therefore independent of the force applied by the object. Further, since the force sensing electrode is overlapped completely by the second drive electrode section, no capacitance may be formed between it an object in proximity to the device. The force measurement is therefore independent of the proximity of objects to the device. Further still, since the force sensing electrode overlaps the second drive electrode section and not the first drive electrode section, no significant parallel plate capacitances are formed between it and the first drive electrode section. As a result, the total load capacitance of the first drive electrode section is minimized and a high frequency signal may therefore be applied to the first drive electrode section during the proximity measurement.

The device therefore overcomes the limitations of the prior art by providing force and touch measurements which are mutually independent and where the operating frequency of the touch sensing function is not reduced. Accordingly, the device may be used to make accurate measurements of the location and applied force of multiple objects touching the surface of the device.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DESCRIPTION OF REFERENCE NUMERALS

Figure 1:
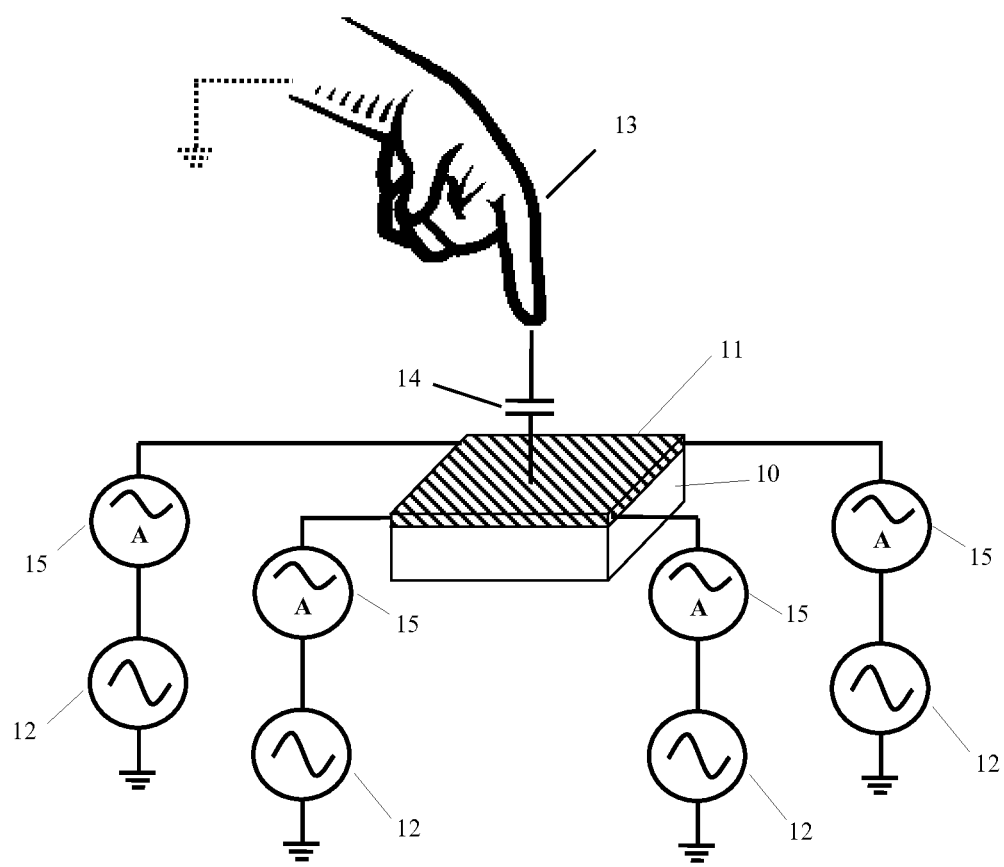
FIG. 1 shows a conventional implementation of a surface capacitance type touch panel.
Figure 2:
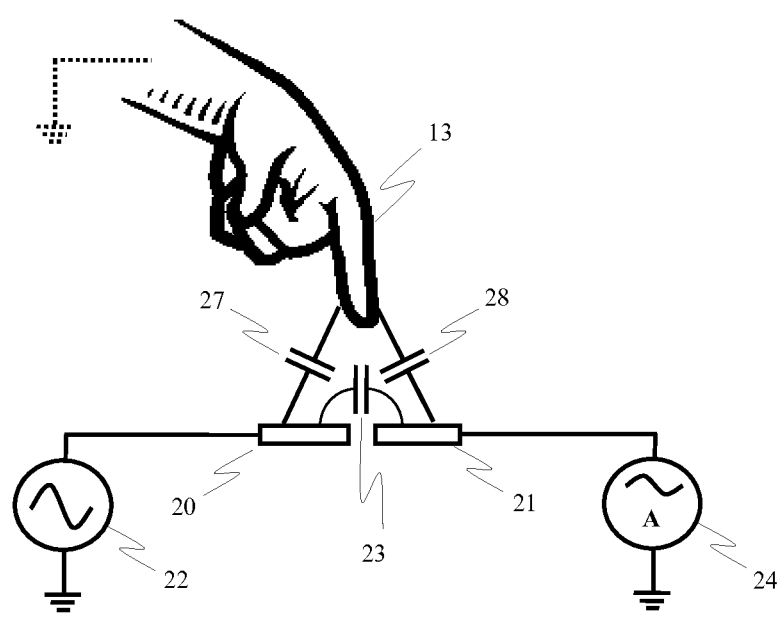
FIG. 2 shows a conventional implementation of a mutual capacitance type touch panel.
Figure 3:
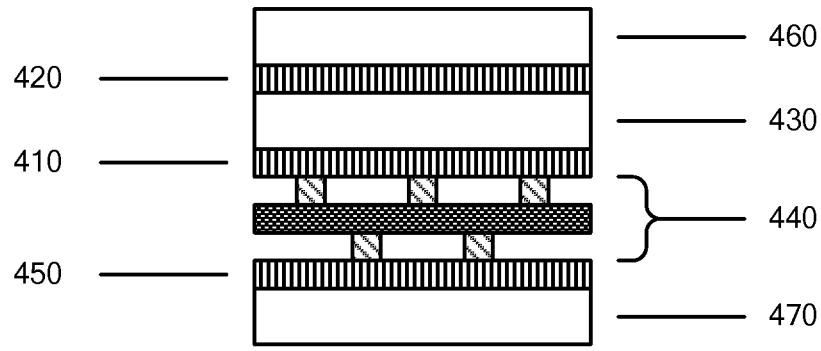
FIG. 3 shows a conventional compressible electrode structure.
Figure 4:
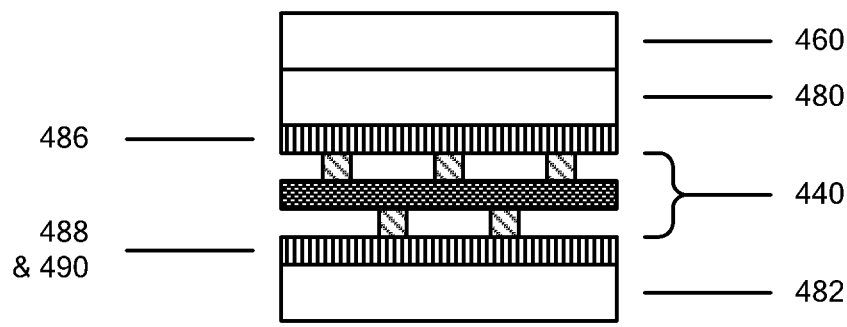
FIG. 4 shows another conventional compressible electrode structure.

10 Transparent substrate
11 Sensing electrode
12 Voltage source
13 Conductive object
14 Capacitor
15 Current sensor
20 Drive electrode
21 Sense electrode
22 Voltage source
23 Mutual coupling capacitor
24 Current measurement means
27 Drive electrode
28 Sense electrode
410 Projected capacitive sense electrodes 420 First set of drive electrodes
430 Sensor substrate
440 Spring structure
450 Second set of drive electrodes
460 Protective cosmetic layer
470 Support substrate
480 First transparent layer
482 Second transparent layer
486 Drive electrodes
488 Touch sensing electrodes
490 Force sensing electrodes
605 Touch sensing device
610 First substrate
620 Second substrate
630 Deformable layer
640 Drive electrodes
645 Sense electrodes
650 First drive electrode section, DA
660 Second drive electrode section, DB
670 Touch sensing electrodes, SA
680 Force sensing electrodes, SB
681 Parallel plate capacitance, CP
685 Fringing field capacitance, CF
690 Object in proximity to the sensor
810 First drive electrode section, DA
815 Second drive electrode section, DB
820 Force sensing electrodes, SB
910 Fringing fields
1010 First set of function generators
1015 First multiplexer
1020 Second set of function generators
1025 Second multiplexer
1030 Touch processor
1040 Sensing circuit
1045 Analogue to digital converters
1101 Operational amplifier
1102 Integration capacitor
1103 Reset switch
1104 Input switch
1105 Input switch
1110 Electrical connection
1402 First drive electrode section, DA
1404 Second drive electrode section, DB
1406 Touch sensing electrodes, SA
1408 Force sensing electrodes, SB
1410 First touch sensing electrode section
1420 Second touch sensing electrode section
1430 First touch sensing electrode section
1435 Odd numbered drive electrodes
1440 Second touch sensing electrode section
1445 Even numbered drive electrodes

DETAILED DESCRIPTION OF INVENTION

In a first and most general embodiment of a touch sensing device in accordance with the present invention, a capacitive touch sensing device, capable of measuring both the location of the force applied by objects touching the surface of the device, is provided.

Figure 5:
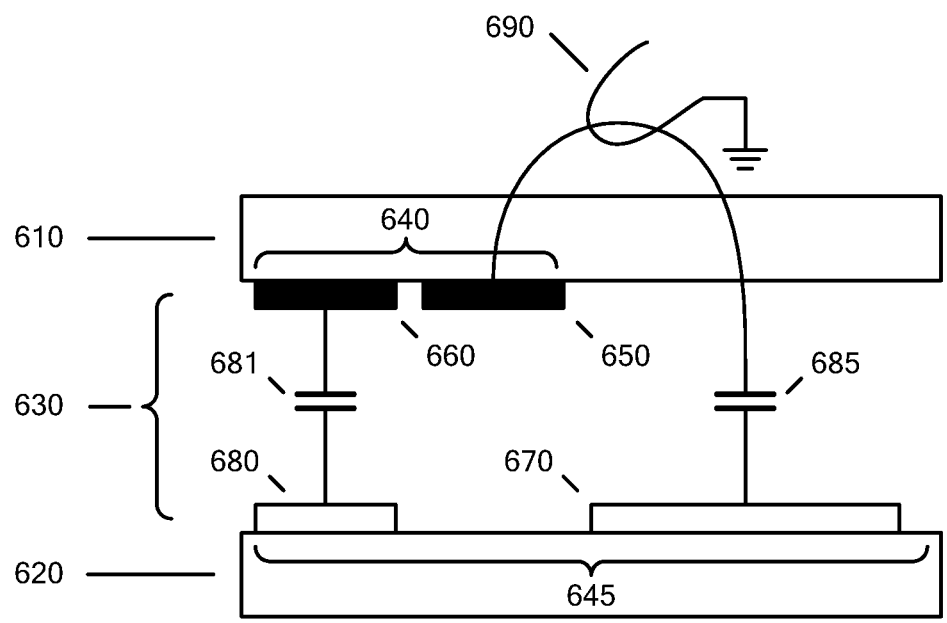
FIG. 5 shows a simplified cross sectional representation of an exemplary electrode arrangement in accordance with the present invention.

An exemplary arrangement of a touch sensing device 605 in accordance with the present embodiment is shown in the cross section diagram of FIG. 5. The device comprises a first substrate 610 and a second substrate 620, separated by an deformable layer 630 that may be compressed by applied forces. Drive electrodes 640 are formed in a conductive layer on the first substrate 610 and the sense electrodes 645 are formed in a conductive layer on the second substrate 620. The substrates may be of a transparent material, such as glass or plastic, the material used as the conductive layer may be a transparent material, such as Indium Tin Oxide (ITO) or the like and the electrode patterns may be formed by standard printing or photolithographic techniques. The sense electrodes 645 may be arranged in an orthogonal direction to the drive electrodes 640. Each drive electrode may be split into two parts: a first drive electrode section, DA 650, and a second drive electrode section, DB 660. The sense electrodes may include touch sensing electrodes, SA 670, and force sensing electrodes, SB 680.

As used herein, a single sensor location of a sensor array is defined by part of a drive electrode, part of a force sensing electrode that positionally overlaps with the part of the drive electrode, and part of a touch sensing electrode that is adjacent to the part of the drive electrode.

The sense electrodes may be further arranged so that SB 680 lies predominantly below DB 660, and therefore forms a parallel plate capacitance, CP 681, to DB 660 but does not lie predominantly below DA 650 and therefore substantially does not form a capacitance with DA 650. As used herein, the sense electrode (e.g., SB 680) "substantially not forming a capacitance" with the drive electrode (e.g., DA 650) means a smaller capacitance is formed between the sense electrode SB 680 and the drive electrode DA 650 relative to the capacitance formed between the sense electrode SB 680 and the drive electrode DB 660, and preferably the capacitance formed between SB 680 and DA 650 is less than 10% of the capacitance formed between SB 680 and DB 660. To measure applied forces, a voltage stimulus is applied to DB, and the current that flows from SB (hereafter termed 'the force sensing signal') is measured. SA is shaped so as to avoid overlap by either DA or DB (i.e., to prevent the formation of a parallel plate capacitor between SA and DA or DB), so the predominant source of coupling from the drive electrodes to SB is via a fringing field capacitance, CF 685, which is modulated by objects 690 in proximity to the sensor. The current that is measured from SA (hereafter termed the 'proximity sensing signal') may therefore be used to detect objects in proximity to the sensor.

The drive electrodes are arranged so that DA occupies the area closest to SA, and so that DB occupies the area furthest away from SA, in the plane of the sensor substrate. This means that the fringing fields between DB and SA are relatively small compared to those between DA and SA. It is therefore possible to drive only DA when detecting objects in proximity to the sensor without significantly reducing the magnitude of the signal generated on SA.

Because SA is shaped so as to avoid overlap by either DA or DB, no significant parallel plate capacitances are formed to SA. Equally, SB lies predominantly below DB and not DA, so no significant parallel plate capacitances are formed to DA. This is advantageous over the prior art, because DA and SA may be operated at high speed to detect objects in proximity to the sensor.

Figure 6:
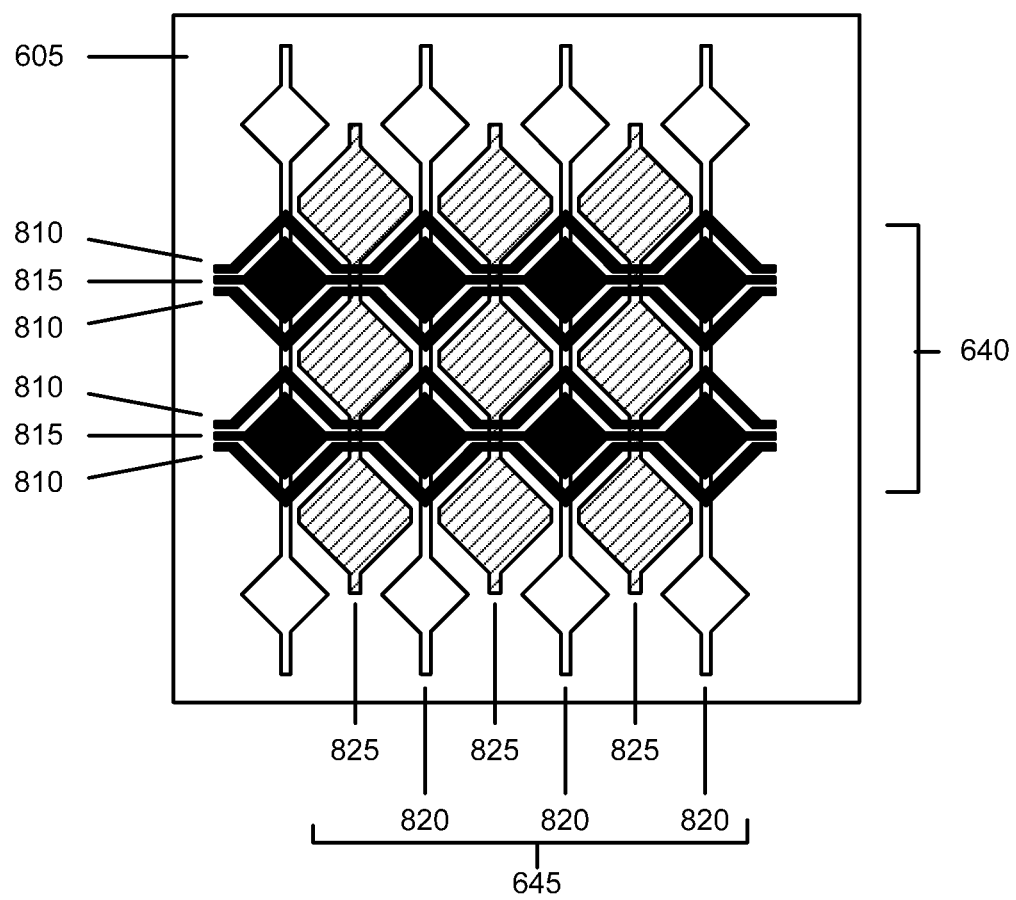
FIG. 6 shows exemplary electrode geometry in accordance with a first embodiment of the present invention.
Figure 7A:
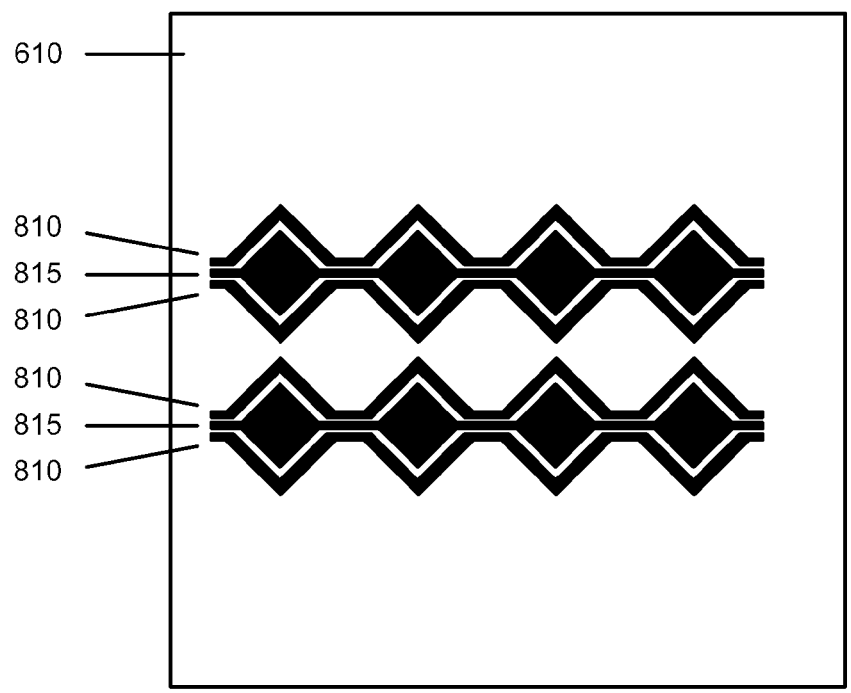
FIG. 7A shows exemplary geometry of electrodes used on a first substrate in accordance with the present invention.
Figure 7B:
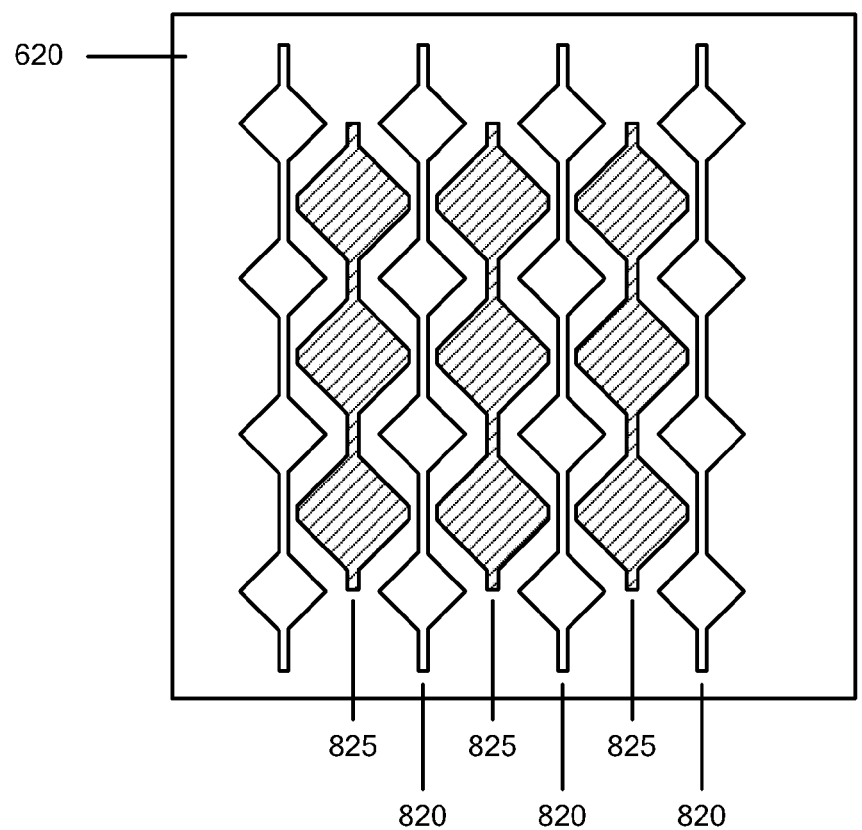
FIG. 7B shows exemplary geometry of electrodes used on a second substrate in accordance with the present invention.

The drive electrodes 640 and sense electrodes 645 may be patterned into a series of tessellating shapes, such as the interconnecting diamond shapes shown in the plan view diagram of FIG. 6. Here, each drive electrode 640 is split into a first drive electrode section, DA 810, which forms a ring shape at the edge of the diamond, and second drive electrode section, DB 815, which forms the centre part of the diamond. The touch sensing electrodes SA 825 occupy the areas between the drive electrode diamonds, such that they are not electrically shielded from proximal objects by the drive electrodes, and do not form parallel plate capacitances to the drive electrodes. The force sensing electrodes SB 820 are positioned beneath only the second drive electrode sections DB 815 of the drive electrodes, and form parallel plate capacitances to these centre parts. For clarity, FIG. 7A shows the electrode geometry on the first substrate 610 and FIG. 7B shows the electrode geometry on the second substrate 620. The use of diamond shapes is intended to illustrate the concept of patterning the first and second drive electrode sections as ring and centre parts of a tessellating shape. Other tessellating shapes may equally be used.

Figure 8:
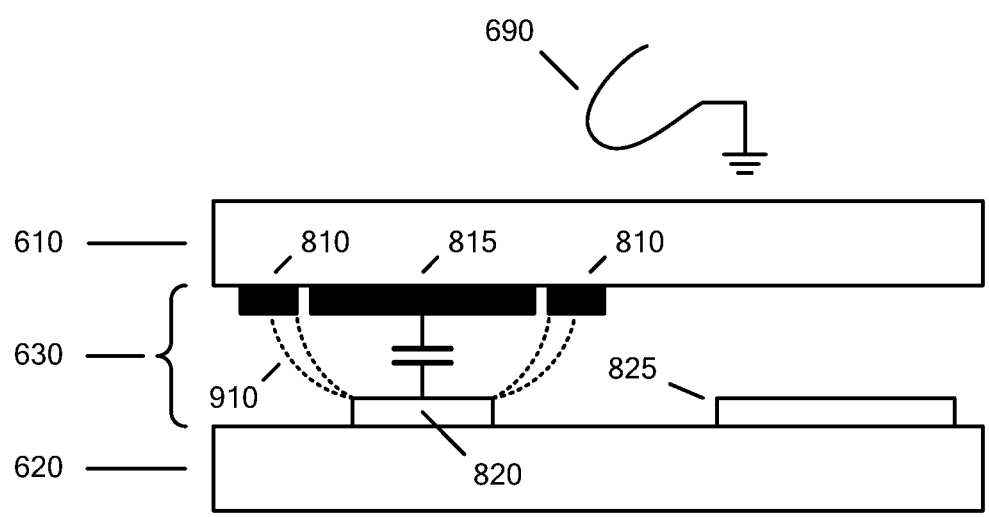
FIG. 8 shows a simplified representation of an exemplary electrode arrangement in accordance with the present invention, and illustrates fringing fields that may be unintentionally formed between DA and DB.

As described above, the force sensing electrodes (SB) may have similar diamond geometry to the touch sensing electrodes (SA), and run parallel and adjacent to the touch sensing electrodes (SA). The force sensing electrode SB 820 may however be patterned such that its diamond shaped area is smaller than the centre part of the diamond shape formed by the second drive electrode section DB 815, as shown in FIG. 8. This reduces unintended coupling through fringing fields 910 between SB 820 and DA 810. This is advantageous because these fringing fields cause the touch sensing electrodes (SA) to respond to applied forces, which has the effect of reducing the overall signal to noise ratio of the sensor. This impairs the sensor's ability to identify small or distant objects above its surface.

Figure 9:
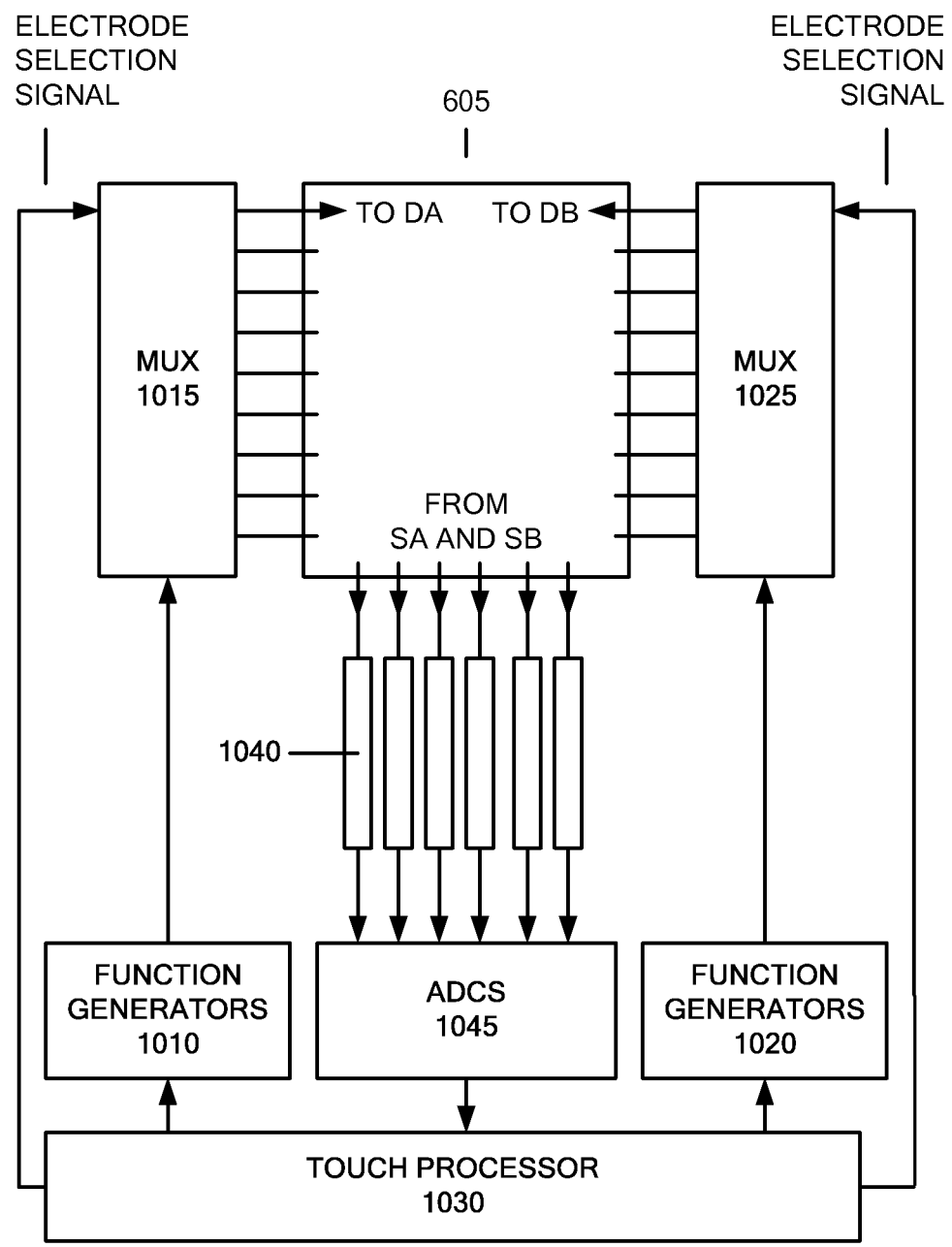
FIG. 9 shows an exemplary circuit arrangement that may be used to operate the sensor.

FIG. 9 shows a circuit arrangement that may be used to operate the touch sensing device 605 to obtain touch location and force measurements. To operate the touch sensing device, a voltage stimulus, such as a square pulse train, is applied to each of the drive electrodes 640 in turn. The voltage stimulus could equally be, for example, a ramp, a triangle waveform or sinusoidal waveform. Note that the voltage stimulus applied to the second drive electrode sections DB 815 may be different to that applied to the first drive electrode sections DA 810. In this example, the voltage stimulus is generated by a first set of function generators 1010, connected through a first multiplexer 1015 to the first drive electrode section DA 810 of a particular drive electrode, and by a second set of function generators 1020, connected through the second multiplexer 1025 to the second drive electrode section DB 815 of a particular drive electrode. The multiplexers and the function generators are under the control of a touch processor 1030. The first sense electrode section and second sense electrode section of each sense electrode are connected to a sensing circuit 1040, which measures the current that flows in each section in response to the voltage stimulus applied to the drive electrodes. The analogue output of each sensing circuit is converted to a digital quantity by a set of analogue to digital converters (ADCs) 1045, and this digital quantity is received by the touch processor 1030.

Figure 10:
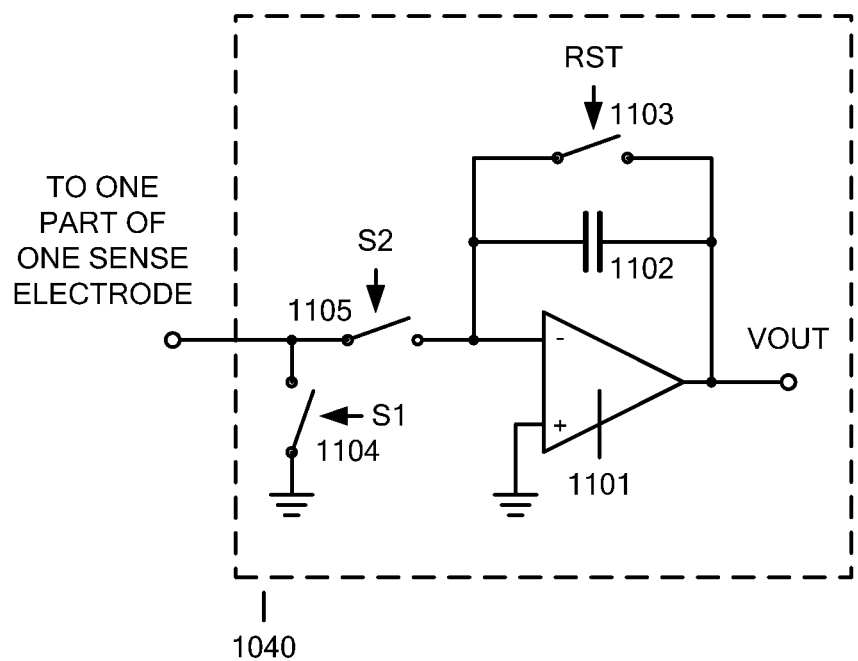
FIG. 10 shows an exemplary charge integrator circuit.

The sensing circuit 1040 may, for example, take the form of a charge integrator circuit, as shown in FIG. 10. Alternatively, other known circuits and techniques for current measurement may be used. The charge integrator circuit of FIG. 10 comprises an operational amplifier 1101, an integration capacitor 1102 and a reset (RST) switch 1103. The charge integrator circuit additionally has input switches 1104 and 1105, which may be operated so as to accumulate charge onto the integration capacitor 1102 over the course of multiple drive voltage pulses. This improves the signal to noise ratio of the measurement. The final amount of charge accumulated on the integration capacitor 1102 is indicative of the mutual capacitance between the stimulated drive electrodes, and the relevant part of the relevant sense electrode.

Figure 11:
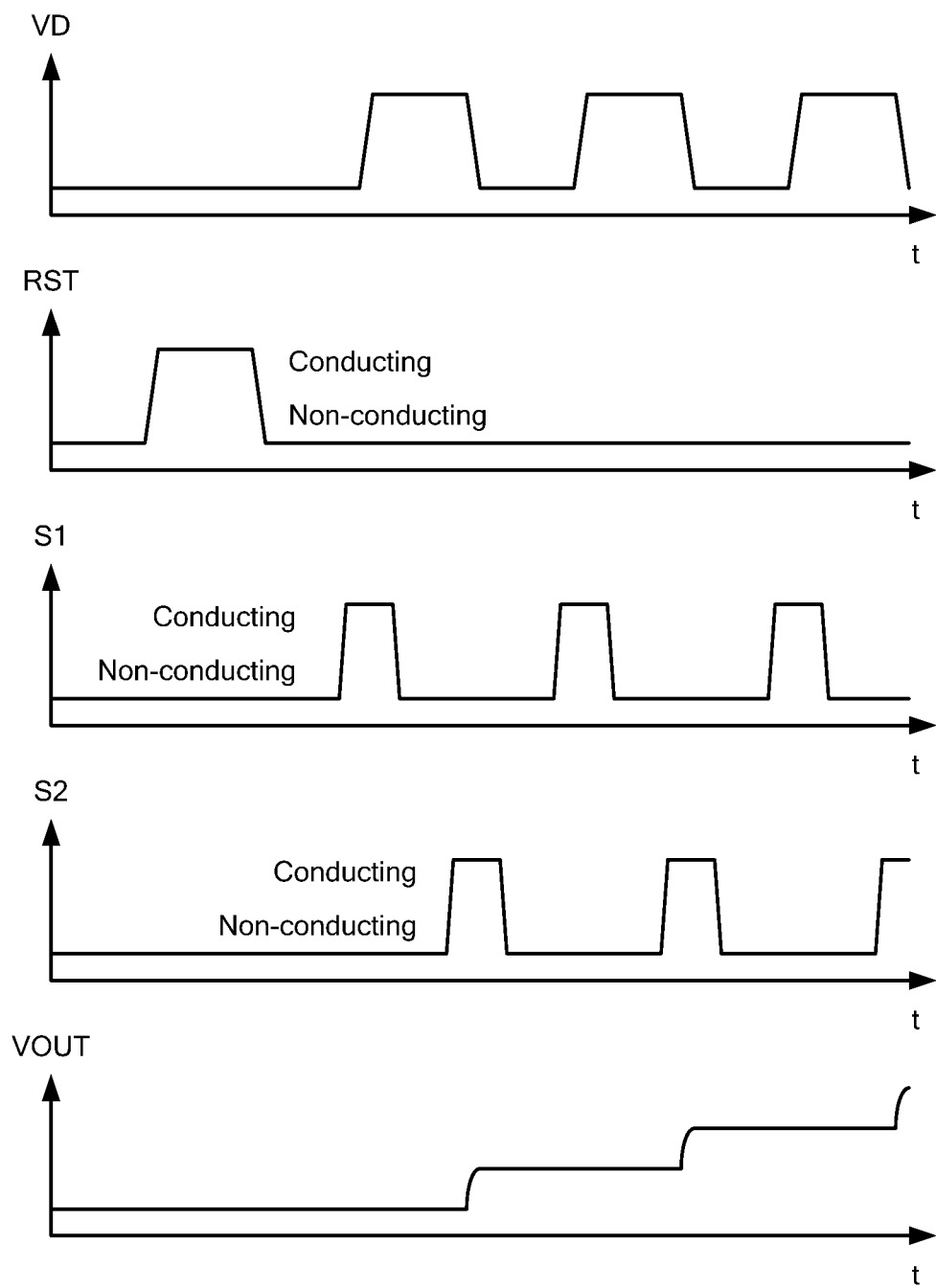
FIG. 11 shows a set of exemplary signal timings that may be used to operate the charge integrator circuit, together with the typical output voltage waveform of the circuit.

The detailed operation of the sensing circuit 1040, shown in FIG. 10, is now described with reference to the waveform diagram of FIG. 11. FIG. 11 shows the timing signals S1, S2 and RST, together with the voltage VD applied to a particular part of a particular drive electrode, and the output voltage of the circuit, VOUT. The reset (RST) switch 1103 is firstly made to temporarily conduct, so that the output voltage VOUT begins at a known voltage. The input switch S1 1104 then conducts to maintain the relevant part of the relevant sense electrode at ground during the rising edge of the first drive voltage pulse. The input switch S1 1104 then becomes non-conducting, and the input switch S2 1105 becomes conducting to allow charge to accumulate on the integration capacitor 1102 during the falling edge of the first drive voltage pulse. This causes the output voltage of the charge integrator circuit to rise by an amount that corresponds to the capacitance between the stimulated drive electrodes and the relevant part of the relevant sense electrode. The alternate operation of switches S1 and S2 may be repeated many times (for example 20 times) in order to accumulate charge from multiple drive voltage pulses, in order to improve the SNR of the measurement, as previously described. The final voltage at the output of the sensing circuit 1040 is then indicative of the mutual capacitance between the stimulated drive electrodes, and the relevant sense electrode.

Figure 12:
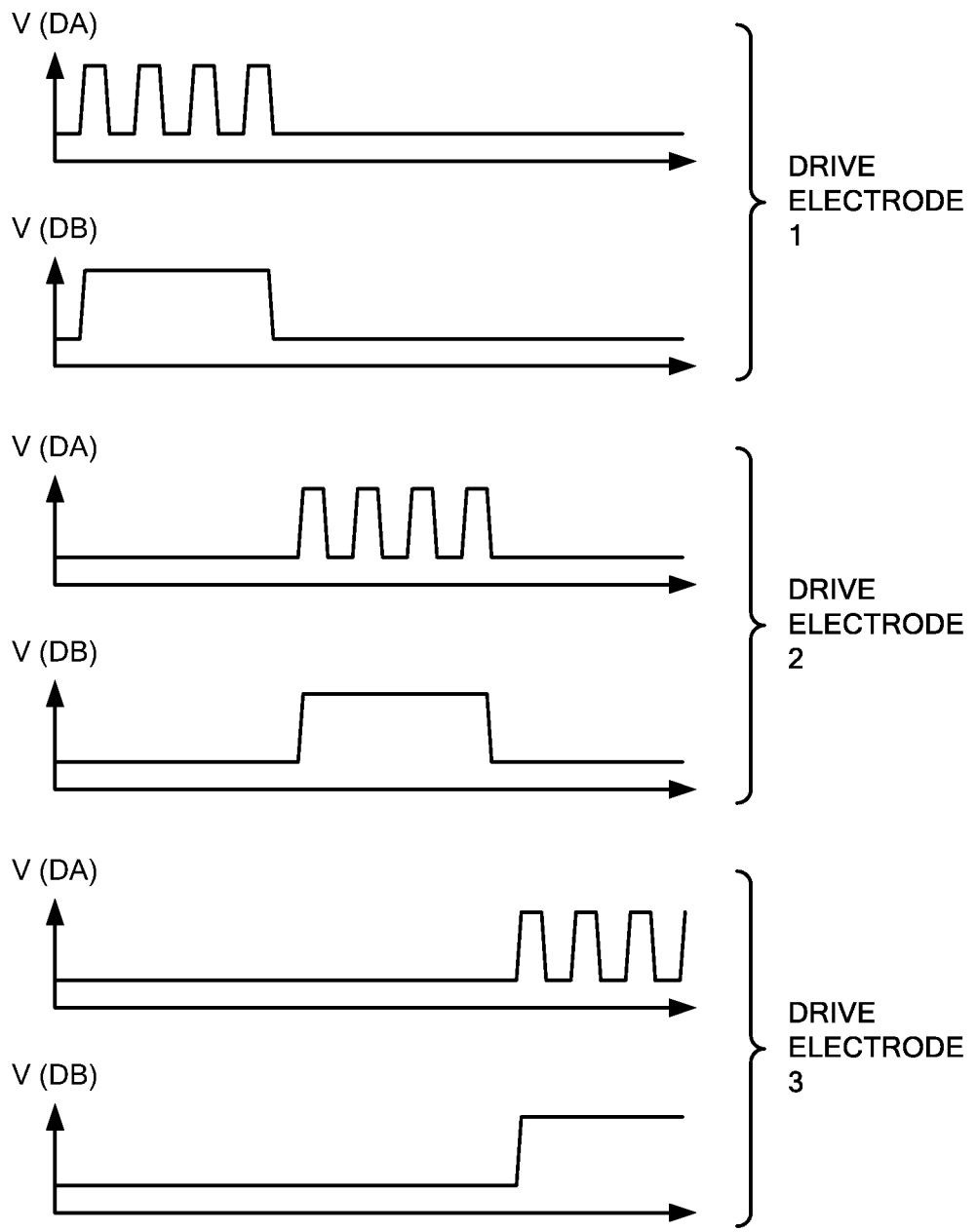
FIG. 12 shows a set of exemplary drive voltage waveforms that may be used to operate a sensor matrix according to the present invention.

An advantage of the device in accordance with the present invention is that it avoids capacitive loading of the drive or sense electrodes that are associated with the sensor's touch sensing function. This allows the touch sensing function to operate at a higher frequency than the force sensing function. This means that, in a given period of time, the first drive electrode section DA 810 may be supplied with more pulses than the second drive electrode section DB 815. This is beneficial to the touch measurement, as the SNR may be raised by accumulating charge over many cycles, and so the capability of the sensor to detect small or distant objects above its surface is improved. FIG. 12 is a possible timing diagram for a system that operates in this manner. FIG. 12 shows the voltages applied to each section of the first three drive electrodes in the sequence. In a first phase, the first section (DA) 810 of drive electrode 1 is excited with a high frequency square pulse train, whilst the second section (DB) 815 of drive electrode 2 is excited with a low frequency square pulse train. In a second phase, the first section (DA) 810 of drive electrode 2 is excited with a high frequency square pulse train, whilst the second section of drive electrode 2 (DB) 815 is excited with a low frequency square pulse train. The sequence continues in this manner until all the drive electrodes have been excited in turn, and thus force and touch measurement results have been obtained at each location on the sensor.

In the device in accordance with the present invention, the force and touch sensing functions remain well separated, such that the force measurement is ideally independent of touch, and the touch measurement is ideally independent of force. This independence is desirable, as it permits force and touch stimuli to be accurately distinguished from one another. However, there may still be a small residual dependence of the force measurement upon touch, or of the touch measurement upon force, for example due to fringing fields within the sensor structure.

Figure 13:
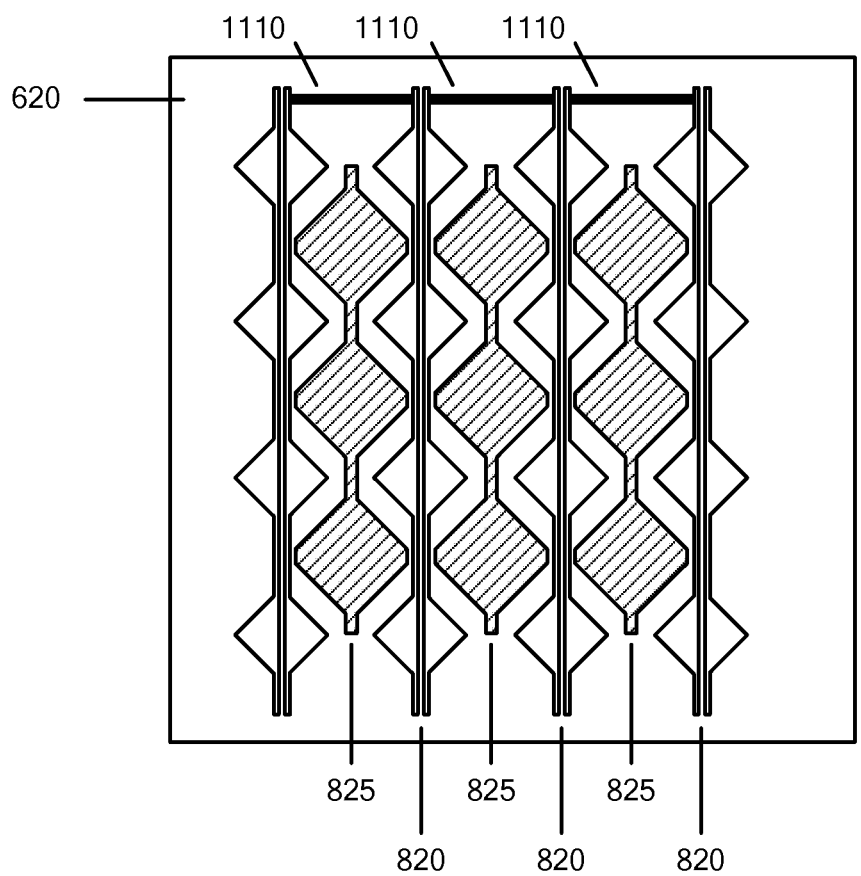
FIG. 13 shows an alternative way of arranging the force sensing electrodes (SB), according to a second embodiment.

In a second embodiment, the force sensing electrodes are arranged symmetrically around the touch sensing electrodes (SA) such that throughout the sensor matrix, the geometric centroids of the force measurement locations are coincident with the geometric centroids of the touch measurement locations. This ensures that the force and touch measurement results, obtained from a pair of adjacent force sensing electrodes and touch sensing electrodes, are the product of similar force and touch stimuli. This is advantageous, because it simplifies mathematical determination of the force and touch stimuli from the measurement results. An example of this alternative arrangement of the touch and force sensing electrodes is shown in FIG. 13, where electrical connections 1110 may be made between the two halves of each force sensing portion (SB).

Figure 14:
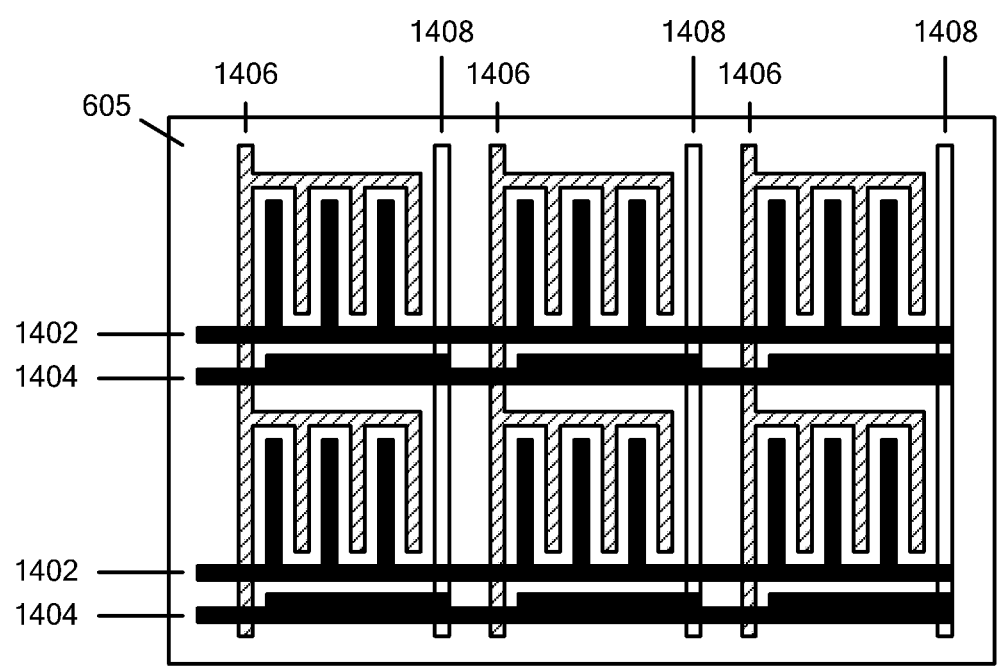
FIG. 14 shows exemplary electrode geometry used for a third embodiment of the present invention.
Figure 15A:
FIG. 15A shows exemplary geometry of electrodes used on the first substrate for the third embodiment.
Figure 15B:
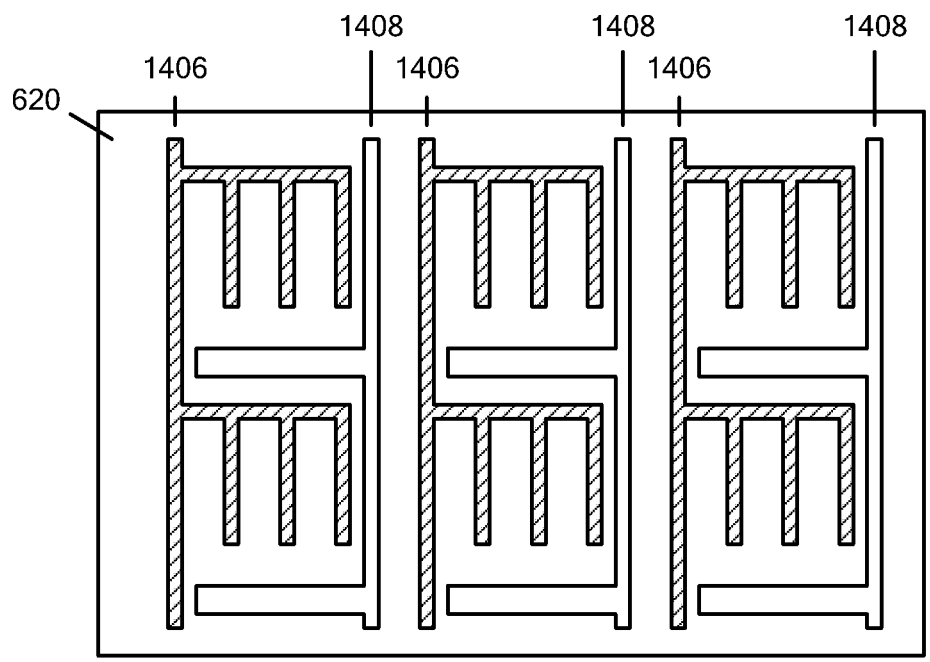
FIG. 15B shows exemplary geometry of the electrodes used on the second substrate for the third embodiment.

In accordance with a third embodiment of the present invention, the drive and sense electrodes are interdigitated. This involves distributing protrusions of the sense electrodes amongst protrusions of the drive electrodes, in order to maximise the distance over which the electrodes run adjacent and in close proximity to one another. This increases the fringing capacitance between the drive and sense electrodes, and therefore improves the touch sensitivity of the device. An interdigitated electrode geometry for the present invention is shown in FIG. 14. In FIG. 14, the drive electrode is again split into a first drive electrode section DA 1402 (which is used for proximity sensing only) and a second drive electrode section DB 1404 (which plays a role in the force measurement). The sense electrode comprises touch sensing electrodes SA 1406 and force sensing electrodes SB 1408. The force sensing electrodes SB 1408 lie predominantly beneath the second drive electrode sections DB 1404. For clarity, FIG. 15A shows the electrode geometry on the first substrate 610, and FIG. 15B shows the electrode geometry on the second substrate 620.

As with the first embodiment, it may be desirable to make the force sensing electrodes SB 820 slightly smaller than the second drive electrode sections DB 1404. This reduces unintended coupling through fringing fields between the force sensing electrodes SB 1408 and the first drive electrode sections DA 1402, and therefore avoids unintentional capacitive loading of the first drive electrode sections DA 1402, allowing the touch measurement to be performed at high frequency.

This third embodiment is operated in the same manner as the first embodiment. The third embodiment may be advantageous over the previous embodiments, because the interdigitated geometry may provide a larger fringing capacitance between the first drive electrode sections DA 1402 and the touch sensing electrodes SA 1406, and may therefore offer a greater signal swing with a higher signal to noise ratio.

Figure 16:
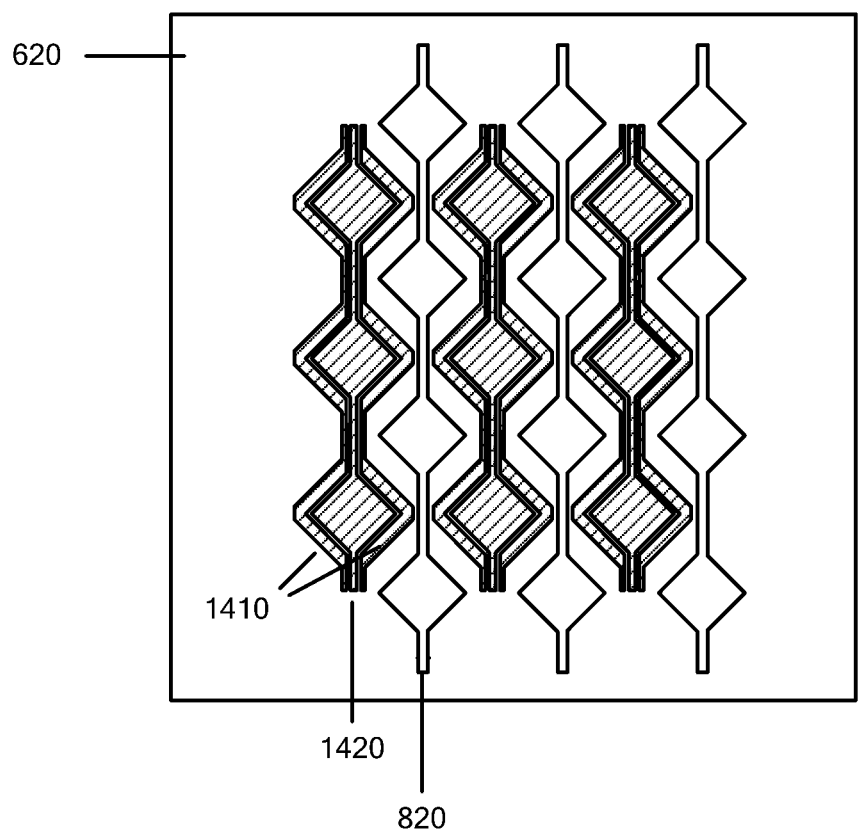
FIG. 16 shows exemplary geometry of the electrodes used on the second substrate, for the fourth embodiment.

In accordance with a fourth embodiment of the present invention, the touch sensing electrode is split into a first touch sensing electrode section and a second touch sensing electrode section. The drive and sense electrodes may be patterned as tessellating diamond shapes, as previously described, whereby the first drive electrode section is patterned to form a ring at the edge of a diamond shape and the second drive electrode section is patterned to form the centre of the diamond shape, as shown in FIG. 7A. Further, the first touch sensing electrode section 1410 may be patterned to form a ring at the edge of a diamond shape, and the second touch sensing electrode section 1420 may be patterned to form the centre of the diamond shape, as shown in FIG. 16. The first touch sensing electrode sections 1410 and the second touch sensing electrode sections 1420 second sections may be connected to different sensing circuits 1040.

Figure 17:
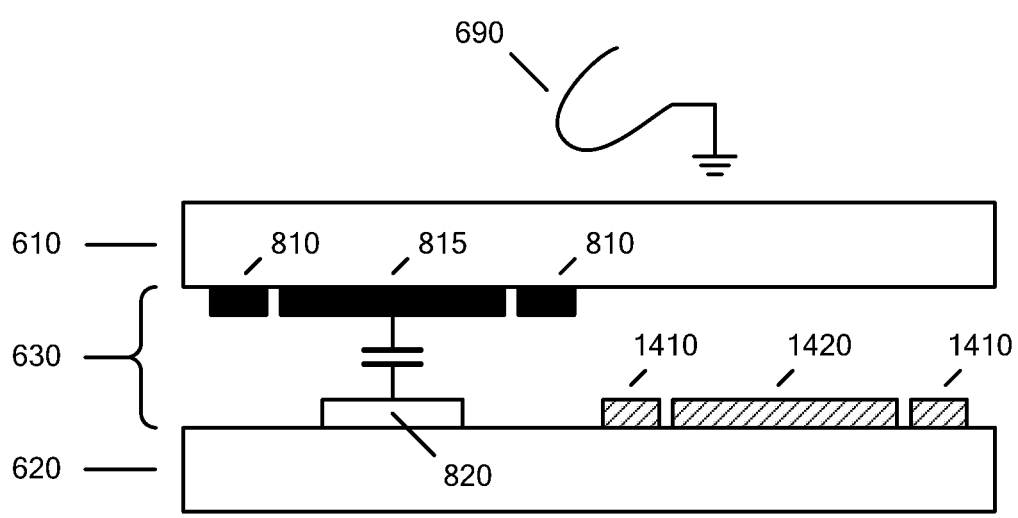
FIG. 17 shows a simplified representation of an exemplary electrode arrangement used in the fourth embodiment.

This fourth embodiment may be advantageous over the previous embodiments, as it allows the present invention to be combined with noise subtraction and height sensing schemes such as that disclosed, for example, in U.S. application Ser. No. 13/541,423 filed on Jul. 3, 2012, which is hereby incorporated in full by reference. U.S. application Ser. No. 13/541, 423 exploits the fact that, at each location on the sensor matrix, the first touch sensing electrode sections 1410 and the second touch sensing electrode sections 1420 couple capacitively to the first drive electrode sections 1402 and the second drive electrode sections 1404 over different distances. This is clear from FIG. 17, which is a simplified cross section of one location on the sensor matrix. For example, in FIG. 17 the first touch sensing electrode section 1410 approaches the first drive electrode section 810 more closely than the second touch sensing electrode section 1420 approaches the second drive electrode section 815. U.S. application Ser. No. 13/541, 423 describes a way in which results from the two touch sensing electrode sections may be combined, for example by subtracting one from the other, in order to reduce the effects of electrical interference. This combination can additionally indicate the height of an object above the sensor substrate, especially if the voltages applied to the first and second drive electrode sections are optimised. This optimisation typically involves applying a positive voltage to the first drive electrode section 1402, and a negative voltage to the second drive electrode section 1404. The fourth embodiment of the present invention is especially advantageous when operated in this manner, as the force sensing electrodes 1408 are influenced only by the second drive electrode sections 1404, and so the two opposing voltage stimuli will not cancel out the force measurement result.

Figure 18A:
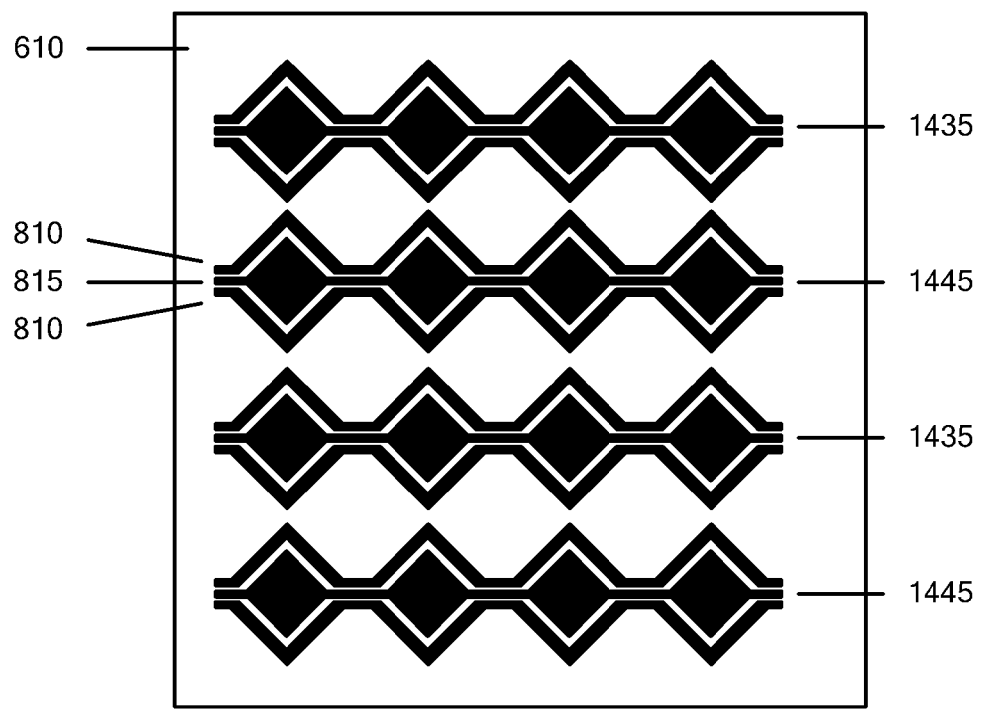
FIG. 18A shows exemplary geometry of the electrodes used on the first substrate for the fifth embodiment.
Figure 18B:
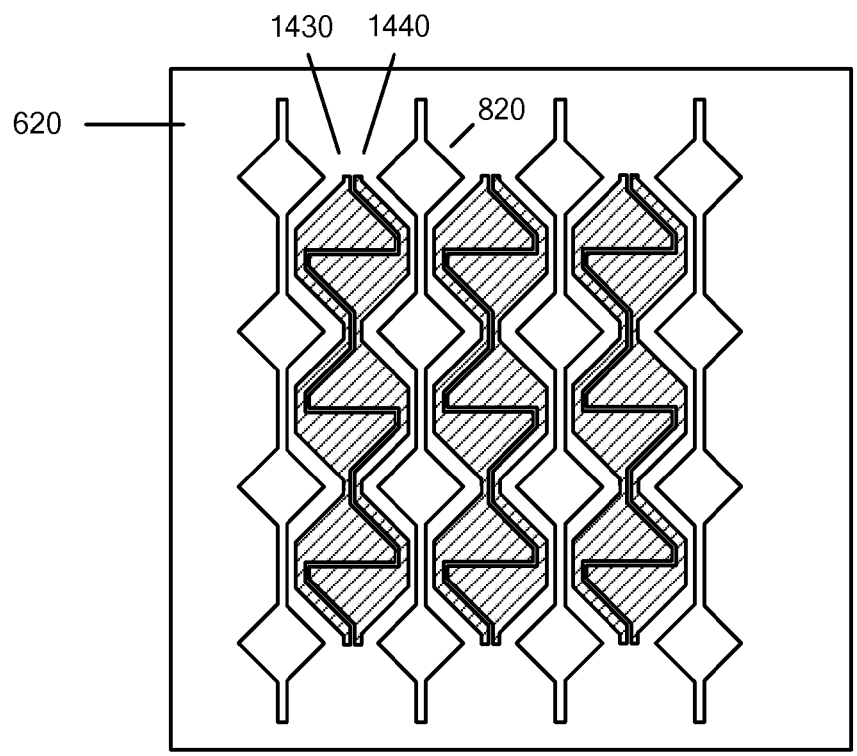
FIG. 18B shows exemplary geometry of the electrodes used on the second substrate for the fifth embodiment.

A fifth embodiment of the present invention is operated similarly to the fourth embodiment. However, in the fifth embodiment, the first touch sensing electrode sections and the second touch sensing electrode sections are dynamically allocated, in the manner described in U.S. application Ser. No. 13/435,898 filed on Mar. 30, 2012 which is hereby incorporated in full by reference. The touch sensing electrodes may therefore have the geometry shown in FIG. 18A (which shows the geometry of the drive electrodes used on the first substrate) and FIG. 18B (which shows the geometry of the force sensing electrodes and the touch sensing electrodes used on the second substrate). In FIG. 18A and FIG. 18B, the majority of the area of the first touch sensing electrode sections 1430 approach the odd numbered drive electrodes 1435 closely, and the majority of the area of the second touch sensing electrode sections 1440 approach the even numbered drive electrodes 1445 closely. Therefore, when an electrical stimulus is supplied to an odd numbered drive electrode 1435, the first touch sensing electrode sections 1430 form fringing capacitances over shorter distances than the second touch sensing electrode sections 1440. Equally, when an electrical stimulus is supplied to an even numbered drive electrode 1445, the second touch sensing electrode sections 1440 form fringing capacitances over longer distances than the first touch sensing electrode sections 1430. The roles of the first and second touch sensing electrode sections are therefore dynamically allocated according to whether an odd or an even drive electrode is stimulated. This fifth embodiment is advantageous over the fourth embodiment, as it permits the first and second touch sensing electrode sections to have very similar geometries, and to occupy identical areas of the touch sensor substrate. This improves the matching of the first and second touch sensing electrode sections to sources of electrical interference, such as a liquid crystal display beneath the touch sensor substrate, and so improves the degree to which such electrical interference may be subtracted from the measurement result. In turn, this improves the signal to noise ratio of the sensor, allowing smaller or more distant objects to be recognised above the sensor's surface.

Figure 19:
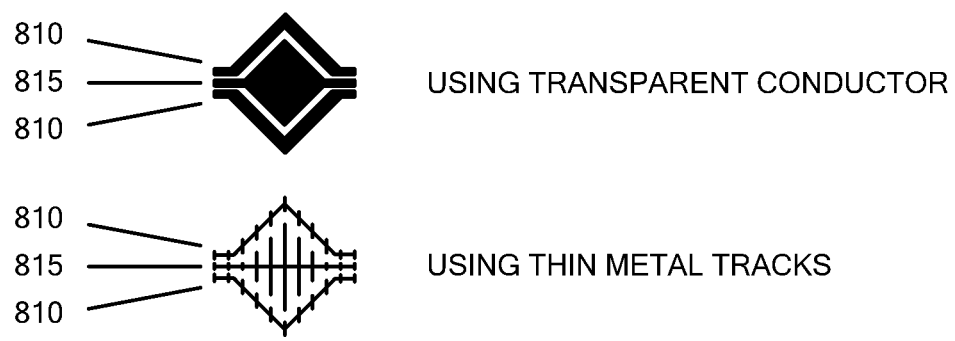
FIG. 19 shows one possible way of defining the drive electrodes using a network of thin metal tracks, according to the sixth embodiment.
Figure 20:
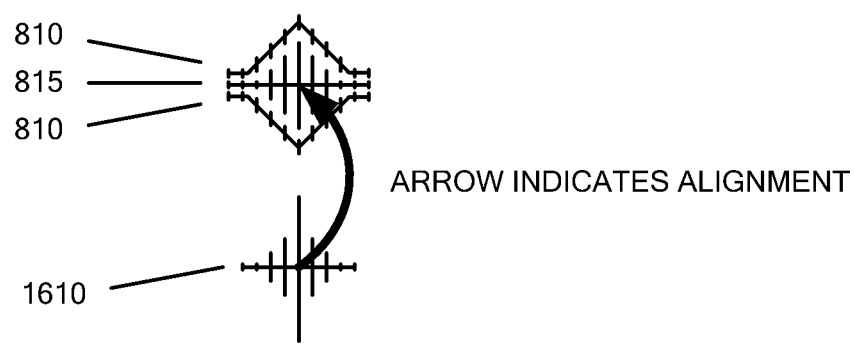
FIG. 20 shows a possible way of defining the force sensing electrodes, and their alignment with the drive electrodes, according to the sixth embodiment.

In the preceding embodiments, each electrode is formed from a transparent conductive material such as ITO. However, the electrodes may equally be formed from metal, for example copper or silver, or from another conducting material. In accordance with a sixth embodiment of the present invention, the drive electrodes, the touch sensing electrodes and the force sensing electrodes are not formed from a transparent conductive material such as ITO, but are instead formed from a network of thin conductive tracks. FIG. 19 shows one possible way of defining the drive electrode shapes using a network of thin metal tracks, using the drive electrode geometry of the first embodiment as an example. As described in the previous embodiments, the first drive electrode section 810 must form an overlap capacitance with the force sensing electrodes 820. For this reason, the metal tracks 1610 that define the force sensing electrode 820 should be aligned parallel to, and directly beneath, the metal tracks that define the second drive electrode section 815. This is shown in FIG. 20. Typical materials for the metal tracks include copper and silver, whilst the typical width of the tracks is 10 um, and the typical thickness of the metal layer is 10 um. This sixth embodiment may be advantageous over the preceding embodiments, as the cost of using transparent conductive material may prove unacceptably high for large area touch sensors. Furthermore, the overall resistance of the drive and sense electrodes may be smaller than in the previous embodiments. This increases the speed of operation of the sensor, which is beneficial as the SNR may be raised by accumulating charge over many cycles, and so the capability of the sensor to detect small or distant objects above its surface is improved.

Although the invention has been shown and described with respect to a certain embodiment or embodiments, equivalent alterations and modifications may occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein exemplary embodiment or embodiments of the invention. In addition, while a particular feature of the invention may have been described above with respect to only one or more of several embodiments, such feature may be combined with one or more other features of the other embodiments, as may be desired and advantageous for any given or particular application.

Industrial Applicability

The invention finds application in touch sensor panels, and touch sensitive display panels, for industrial and consumer electronics. It is ideally suited to products such as mobile phones, tablet computers and 'e-readers'.

What is claimed is:

1. A capacitive touch panel, comprising:
a plurality of drive electrodes arranged in a first direction, each drive electrode including a first drive electrode section and a second drive electrode section; and
a plurality of sense electrodes arranged in a second direction, each sense electrode including a touch sensing electrode and a force sensing electrode,
wherein each force sensing electrode of the plurality of sense electrodes is arranged relative to a drive electrode of the plurality of drive electrodes to form a force sensitive coupling capacitance with the second drive electrode section of the respective drive electrode and substantially not with the first drive electrode section of the respective drive electrode,
wherein for a sensor location the first drive electrode section of each drive electrode does not positionally overlap with a touch sensing electrode or a force sensing electrode.

2. The touch panel according to claim 1, wherein the plurality of touch sensing electrodes do not positionally overlap with a drive electrode of the plurality of drive electrodes.

3. The touch panel according to claim 1, further comprising:
a first substrate having a first conductive layer; and
a second substrate having a second conductive layer, wherein the plurality of drive electrodes are formed in the first conductive layer, and the plurality of sense electrodes are formed in the second conductive layer.

4. The touch panel according to claim 3, wherein the second drive electrode section of a drive electrode, in a plane of the first or second substrate, is further from a touch sensing electrode than the first drive electrode section of the respective drive electrode.

5. The touch panel according to claim 4, further comprising a deformable layer arranged between the first substrate and the second substrate.

6. The touch panel according to claim 1, wherein the force sensing electrode is arranged to form a parallel plate capacitor with a corresponding second drive electrode section.

7. The touch panel according to claim 1, wherein the force sensing electrode is smaller in size than the second drive electrode section.

8. The touch panel according to claim 1, wherein the plurality of drive electrodes and the plurality of sense electrodes comprise a series of tessellating shapes.

9. The touch panel according to claim 8, wherein the force sensing electrodes are arranged parallel and adjacent to respective ones of the touch sensing electrodes.

10. The touch panel according to claim 1, wherein the force sensing electrode is arranged to positionally overlap with the second drive electrode section of a drive electrode, the force sensing electrode and respective second drive electrode section forming a parallel plate capacitor.

11. The touch panel according to claim 1, wherein at least one of the drive electrodes, the touch sensing electrodes or the force sensing electrodes are formed from a network of conductive tracks.

12. The touch panel according to claim 1, wherein the drive electrodes and sense electrodes are interdigitated.

13. The touch panel according to claim 1, wherein the force sensing electrodes are arranged symmetrically around the touch sensing electrodes.

14. The touch panel according to claim 1, wherein the force sensing electrodes are arranged such that for each sense electrode a geometric centroid of a force measurement location is coincident with a geometric centroid of a touch measurement location.

15. The touch panel according to claim 1, wherein each touch sensing electrode is split into a first touch sensing electrode section and a second touch sensing electrode section, and the first touch sensing electrode section forms at least a partial ring around the second touch electrode section.

16. The touch panel according to claim 1, wherein the touch sensing electrodes comprise a first touch sensing electrode section and a second touch sensing electrode section, and a majority of the area of the first touch sensing electrode section is closer to odd numbered drive electrode than the second touch sensing electrode section, and the majority of the area of the second touch sensing electrode section is closer to even numbered drive electrodes than the first touch sensing electrode section.

17. The touch panel according to claim 1, further comprising circuitry operatively coupled to the plurality of drive electrodes and the plurality of sense electrodes, the circuitry configured to:

determine a location on the touch panel at which an object touches the touch panel; and determine a force applied at the determined location.

18. The touch panel according to claim 17, wherein the circuitry comprises a processor configured to:

sequentially apply a stimulus signal to each drive electrode;

measure a signal at the force sensing electrodes and touch sensing electrodes of each sense electrode, said signal in response to capacitive coupling between the drive electrodes and sense electrodes due to an object touching a surface of the touch panel; and calculate a location and force of the object touching the surface of the touch panel based on the measured signal.

19. A capacitive touch panel, comprising:

a plurality of drive electrodes arranged in a first direction, each drive electrode including a first drive electrode section and a second drive electrode section; and a plurality of sense electrodes arranged in a second direction, each sense electrode including a touch sensing electrode and a force sensing electrode, wherein each force sensing electrode of the plurality of sense electrodes is arranged relative to a drive electrode of the plurality of drive electrodes to form a force sensitive coupling capacitance with the second drive electrode section of the respective drive electrode and substantially not with the first drive electrode section of the respective drive electrode, and wherein the plurality of drive electrodes and the plurality of sense electrodes comprise a series of tessellating shapes having interconnecting diamond shapes, and each first drive electrode section of a drive electrode forms at least a partial ring around the second drive electrode section of the respective drive electrode.

* * * * *